(12) United States Patent
Dalrymple

(10) Patent No.: US 6,860,304 B1
(45) Date of Patent: Mar. 1, 2005

(54) TWO SIDED TRACTION BELT FOR TIRES

(76) Inventor: Basil Ethan Dalrymple, 1267 Cross Ave., Bronx, NY (US) 10472

(*) Notice: Subject to any disclaimer, the term of this patent is extended or adjusted under 35 U.S.C. 154(b) by 0 days.

(21) Appl. No.: 10/299,754

(22) Filed: Nov. 19, 2002

(51) Int. Cl.[7] .............................................. B62C 27/02
(52) U.S. Cl. ...................... 152/175; 152/187; 152/219; 152/222
(58) Field of Search ................................ 152/170, 175, 152/185, 187, 217, 219, 221, 222

(56) References Cited

U.S. PATENT DOCUMENTS

| | | | | |
|---|---|---|---|---|
| 1,403,385 A | * | 1/1922 | Burt ............................. | 152/189 |
| 1,423,026 A | * | 7/1922 | Rollins ......................... | 152/222 |
| 1,908,808 A | * | 5/1933 | Auciunas ...................... | 152/177 |
| 1,934,173 A | * | 11/1933 | De Vault ...................... | 152/242 |
| 2,275,994 A | * | 3/1942 | Ruhkala ....................... | 152/219 |
| 3,913,651 A | * | 10/1975 | Stonack ................... | 152/213 R |
| 4,036,272 A | * | 7/1977 | Lee ............................. | 152/210 |
| 4,171,718 A | * | 10/1979 | Walrave et al. ............. | 152/222 |
| 4,405,006 A | * | 9/1983 | Preusker ...................... | 152/170 |
| 4,747,437 A | | 5/1988 | Magee | |
| 4,854,357 A | | 8/1989 | Mostafa Taha | |
| 4,862,937 A | | 9/1989 | Nakajima | |
| 5,303,757 A | | 4/1994 | Wakarsuki et al. | |
| 5,454,413 A | | 10/1995 | Morelli | |
| 5,513,684 A | | 5/1996 | Laub | |
| 5,569,340 A | | 10/1996 | Ulrich | |

FOREIGN PATENT DOCUMENTS

JP              62-191206        *   8/1987

* cited by examiner

Primary Examiner—Russell D. Stormer
(74) Attorney, Agent, or Firm—Michael I. Kroll

(57) ABSTRACT

Disclosed is a traction belt 16 installed onto the surface of a tire 12 having a plurality of spike-like members 18 with each spike-like member having two distal ends with one end protruding through each side of the traction belt 16 to provide on the outer side of the belt 16 structure for gripping icy or snow packed surfaces, while on the inner side of the belt 16 the spike like members 18 provide frictionally sustained attachment for the traction belt 16 onto the outer surface of the tire. A securement cable 22, tension cable 24 and threaded tightness adjustment device 26 are used wherein the securement cables 22 are attached to the exterior surface of the traction belt 16 by figure eight securements 28 and then tightened by the tension cable 24 by reducing its circumference via the tightness adjustment 26. The securement cables 22 are secured to the belt 16 by figure eight cable loops 30 fastened to the belt 16 by studs 32 to secure the securement cable 22 in a way that movement of the securement cable 22 cannot occur in either direction about the circumference of the exterior traction belt 16.

7 Claims, 5 Drawing Sheets

TWO SIDED TRACTION BELT FOR TIRES

BACKGROUND OF THE INVENTION

1. Field of the Invention

The present invention relates generally to a device for increasing a tire's traction and, more specifically, to a device having a plurality of spike-like members fixedly attached at its inner portion to a traction belt composed of a durable, pliable material. The exterior distal ends of the spike-like members grip either icy or snow packed surfaces while the opposing distal ends are for securement of the belt to the exterior surface of the tire by penetrating or wedging the interior distal end into the tire surface. Additionally, a securement cable, tension cable and tightness adjustment are used in a configuration in that the securement cables are attached to the exterior surface of the traction belt by figure eight securements then tightened by the tension cable by reducing its circumference via the tightness adjustment. The securement cables are secured to the belt by figure eight cable loops fastened to the belt by studs to secure the securement cable in a way that movement of the securement cable can not occur in either direction about the circumference of the exterior traction belt.

2. Description of the Prior Art

There are other traction devices designed to aid in driving on snow and ice. Typical of these is U.S. Pat. No. 5,454,413 issued to Morelli on Oct. 3, 1995.

Another patent was issued to Ulrich on Oct. 29, 1996 as U.S. Pat. No. 5,569,340. Yet another U.S. Pat. No. 5,513,684 was issued to Laub on May 7, 1996 and still yet another was issued on Apr. 19, 1994 to Wakatsuki as U.S. Pat. No. 5,303,757.

Another patent was issued to Nakajima on Sep. 5, 1989 as U.S. Pat. No. 4,862,937. Yet another U.S. Pat. No. 4,854,357 was issued to Mostafa Taha on Aug. 8, 1989 and still yet another was issued on May 31, 1988 to Magee as U.S. Pat. No. 4,747,437.

U.S. Pat. No. 5,454,413

Inventor: Richard L. Morelli

Issued: Oct. 3, 1995

An automobile traction enhancement device including a detachable continuous track disposed circumferentially around an automobile road tire. The track comprises a strong flexible, matt-like material having a plurality of evenly spaced U-shaped cleats and bars, attached across the underlying tire tread area. The automobile traction enhancement device configured as an elongated strip having the bars and a portion of the cleats facing a road surface is first positioned in a driving path of a driven road wheel and the automobile is driven thereon. The device is then wrapped around the tire tread portion and interjoined by a pin which is inserted through holes in the track ends thereby linking the ends for use. The cleat side engages the road wheel sidewalls thereby precluding side slippage from the wheel. The bars and a portion of the cleats engage the roadway thereby providing traction in snow and ice surface conditions.

U.S. Pat. No. 5,569,340

Inventor: Fritzler Ulrich

Issued: Oct. 29, 1996

A traction device for a tire for a driven wheel of a vehicle includes a base for resting circumferentially upon the tread of a tire. The device includes an adjustable clamp assembly extending across the base longitudinally and includes a front and rear jaw which, when mounted, hold onto the side walls of the tire. The front jaw is adjustable in any and all of three different settings: course, normal and fine.

U.S. Pat. No. 5,513,684

Inventor: Charles E. Laub

Issued: May 7, 1996

A traction enhancing device for automobile tires includes a support ring and a plurality of cleat assemblies which are mounted on the support ring. The cleat assemblies include cleat members which extend over the tread portion of a tire and which include projections to enhance traction. The cleat members are able to slide inwardly in the cleat assemblies by latches which facilitate rapid installation and removal of the device without a need for tools of any type or for jacking up of the vehicle.

U.S. Pat. No. 5,303,757

Inventor: Tomio Wakasuki et al.

Issued: Apr. 19, 1994

A tire anti-skid device comprises a mounting member removably mounted on a side surface of a wheel of an automobile in such a manner as to be coaxial with the wheel; a plurality of arms made of elastic bodies, which radially extend from the mounting member; ground contact portions each being formed by bending the leading edge of each of the arms, which are intended to be brought in contact with a tire tread surface; a ground contact ring for connecting the adjacent ground-contact portions with each other, which is intended to be brought in contact with the tire tread surface; and reverse portions each being formed at a junction portion between the arm and the ground-contact portion, which are intended to reverse the ground-contact portions in such a manner that the inner surfaces in contact with the tire tread surface becomes the outer peripheral surfaces. The above anti-skid device is mounted to the tire in such a manner that the mounting member is mounted on the wheel in the state the ground-contact portions are reversed, and is brought in contact with the tire tread surface by reversing operation of the ground-contact portions.

U.S. Pat. No. 4,862,937

Inventor: Masahiro Nakajima

Issued: Sep. 5, 1989

An antiskid attachment for use with an automotive wheel having a tire includes a base plate adapted to be positioned on one side of the wheel. A plurality of spaced-apart ground engaging band members are mounted peripherally around the base plate in cantilevered manner and are adapted to be positioned on the outer surface of the tire. Each of the band members has a transverse hole formed in the free end thereof. A fastening cord is passed through the holes of the band members for releasably tensioning the band members. Tying means is provided for releasably tying the fastening cord to the outside surface of the base plate with the band members tensioned by the fastening cord.

U.S. Pat. No. 4,854,357

Inventor: Maher A. H. Mostafa Taha

Issued: Aug. 8, 1989

An apparatus for use with an automotive wheel including a tire to provide additional traction includes a first and a second ring member fabricated of hard grooved metal material, each having a sufficient diameter and held in a spaced-apart parallel relation by a plurality of transversely oriented angled bar members rigidly connected at each end and equally spaced along the circumference of the rings to the rings so as to be adapted to receive therein and therebetween the tire. The angled bar members each having a convex portion member oriented towards the tire and a concave portion oriented away from the tire. At least one selectively adjustable strap is provided for connecting both of the ring members to the tire in a rotationally fixed, but removable relation. The selectively adjustable strap has sufficient length to engage both the ring members and the tire in a compressive relation.

U.S. Pat. No. 4,747,437

Inventor: James T. Magee

Issued: May 31, 1988

A traction device for mounting on pneumatic tire to assist in extricating a motor vehicle from snow, ice or mud is disclosed. The traction device, generally U-shaped in cross section, is provided with a wide base having an upwardly-curving segment which results in greater gripping action when the device is mounted on a tire.

While these tire traction devices may be suitable for the purposes for which they were designed, they would not be as suitable for the purposes of the present invention, as hereinafter described.

SUMMARY OF THE PRESENT INVENTION

The present invention discloses a traction belt installed onto the surface of a tire. The present invention has a plurality of spike-like members with each spike-like member having two distal ends with one end protruding through each side of the traction belt to provide on the outer side of the belt a means for gripping icy or snow packed surfaces, while on the inner side of the belt the spike like members provide a means of frictionally sustained attachment for the traction belt onto the outer surface of the tire. The exterior distal ends of the spike-like members grip either an icy or snow-packed surface while the opposing distal ends are for securement of the belt to the exterior surface of the tire by penetrating or wedging the interior distal end into the tire surface. A securement cable, tension cable and tightness adjustment means are used in a configuration in which the securement cables are attached to the exterior surface of the traction belt by figure eight securements then tightened by the tension cable by reducing its circumference via the tightness adjustment. The securement cables are secured to the belt by figure eight cable loops fastened to the belt by studs to secure the securement cable in a way that movement of the securement cable cannot occur in either direction about the circumference of the exterior traction belt.

A primary object of the present invention is to provide a traction device that can be mounted to a motor vehicle tire during icy or snow packed conditions.

Another object of the present invention is to provide a traction device with a plurality of spike-like members to grip icy or snow-packed surfaces.

Yet another object of the present invention is to provide a traction device that can be composed of multiple compositions typically nylon or steel mesh or any other suitable durable, pliable material.

Still yet another object of the present invention is to provide a traction device that has additional adjustable securement through a network of a plurality of cables and loops and figure eight securements and adjustments.

Yet another object of the present invention is to provide a traction device that can be directly affixed to the tire surface of a motor vehicle.

Additional objects of the present invention will appear as the description proceeds.

The present invention overcomes the shortcomings of the prior art by providing a traction device with a plurality of spike-like members for gripping icy or snow packed surfaces with the spikes opposing distal end securing to the tire surface along with a plurality of assorted cables with a means for adjustment.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
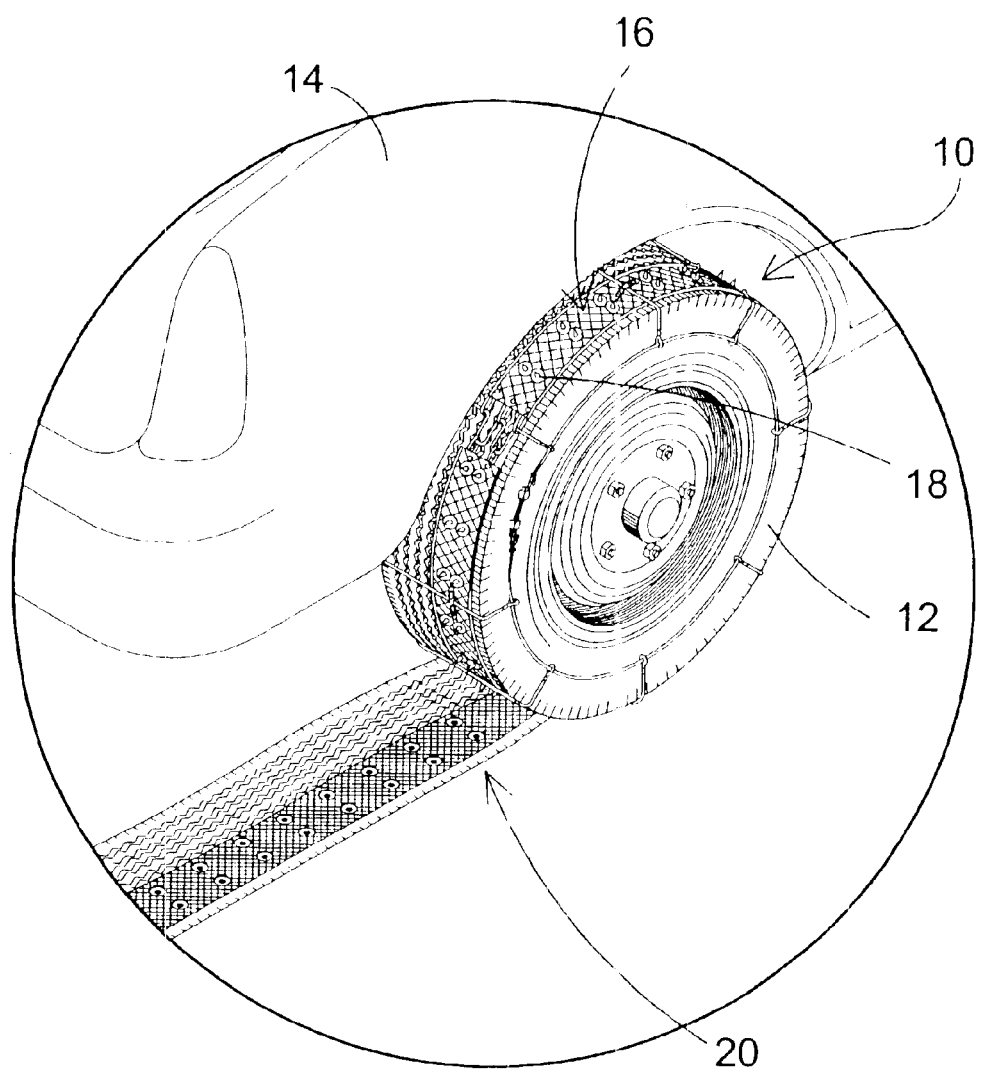
FIG. 1 is a perspective view of the present invention installed on a tire.

With regard to reference numerals used, the following numbering is used throughout the drawings.

10 present invention
12 tire
14 vehicle
16 traction belt
18 spike-like member
20 icy surface
22 securement cable
24 tension cable
26 tightness adjustment means
28 figure eight securement members
30 cable loop
32 stud
34 tread
36 clip
38 embedding member
40 durable pliable material.

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is a perspective view of the present invention 10 installed on a tire 12. Shown is a motor vehicle 14 having the present invention 10 circumferentially installed on the tire 12. Also shown is the outer surface of the traction: belt 16 having a plurality of spike-like members 18 to grip an icy or snow packed surface 20.

Figure 2:
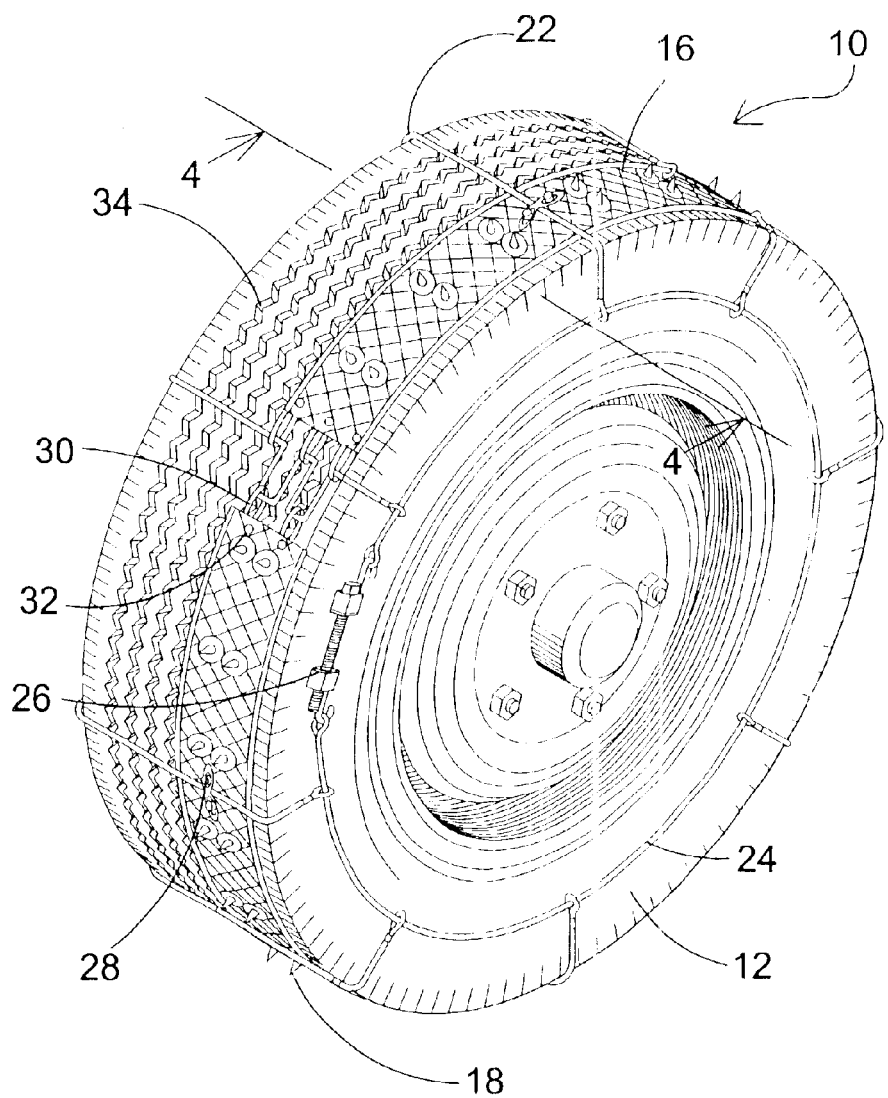
FIG. 2 is a perspective front view of the present invention installed onto the surface of a tire.

Turning to FIG. 2, shown therein is a perspective front view of the present invention 10 installed onto the surface of a tire 12. Shown is the present invention 10 having a plurality of spike-like members 18 with each spike-like member having two distal ends with one end protruding through each side of the traction belt 16 to provide on the outer side of the belt 16 a means for gripping icy or snow packed surfaces, while on the inner side of the belt 16 the spike like members 18 provide a means of frictionally sustained attachment for the traction belt 16 onto the outer tread surface of the tire 12. The exterior distal ends of the spike-like members 18 grip either an icy or snow-packed surface while the opposing distal ends are for securement of the belt 16 to the exterior surface of the tire 12 by penetrating or wedging the interior distal end into the outer surface of the tread of the tire. Also shown are a plurality of securement cables 22 being perpendicular to the belt 16, tension cable 24 and tightness adjustment means 26 used in a configuration in which the securement cables 22 are attached to the exterior surface of the traction belt 16 by figure eight securement members 28 then tightened by the tension cable 24 having its circumference reduced via the tightness adjustment means 26. The securement cables 22 are secured to the belt 16 by figure eight cable loops 28 fastened to the belt 16 by studs 32 to secure the securement cable 22 in a way that movement of the securement cable 22 cannot occur in either direction about the circumference of the exterior traction belt 16. Cable loops 30 have eyelet-like structures in the ends thereof for receiving the securement cable therethrough to join the ends of the belt 16 together. Also shown is the tread 34 of the tire 12 with the traction belt 16 covering about one-half the width of the tread 34 surface.

Figure 3:
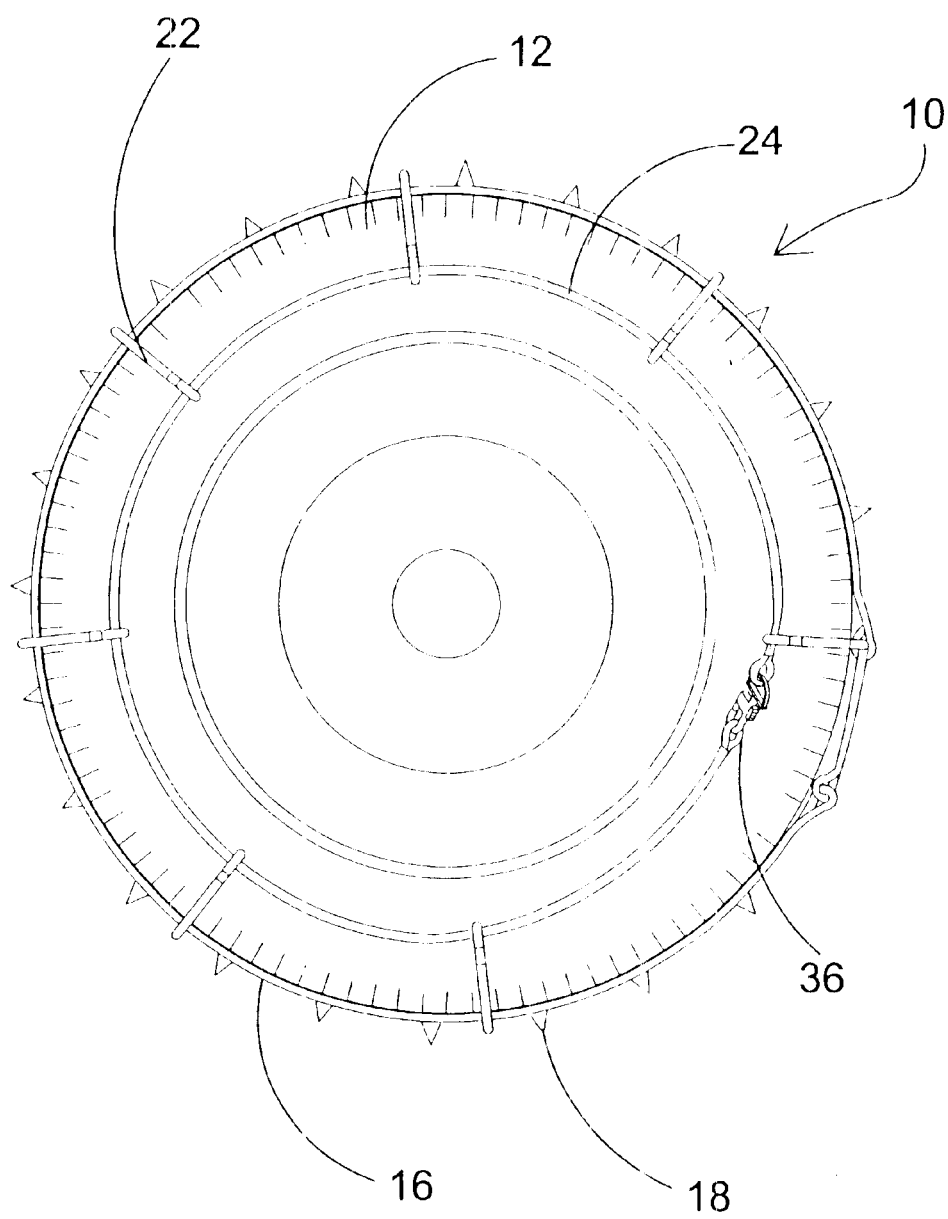
FIG. 3 is a back view of the present invention installed onto the surface of a tire.

Turning to FIG. 3, shown therein is a back view of the present invention 10 installed onto the surface of a tire 12. Shown is the present invention 10 having a plurality of spike-like members 18 protruding through both sides of the traction belt 16 so that on the inner side of the belt 16 the spike like members 18 penetrate into the surface rubber of the tire 12 to provide a means for the traction belt 16 to remain secured and stationary upon: the outer surface of the tire 12. Also shown is the quick-attach, quick-release clip 36 disposed on the backside of the tire that allows for easy installation and removal of the present invention 10 from the tire 12. Also shown are the securement cable 22 and the backside tension cable 24.

Figure 4:
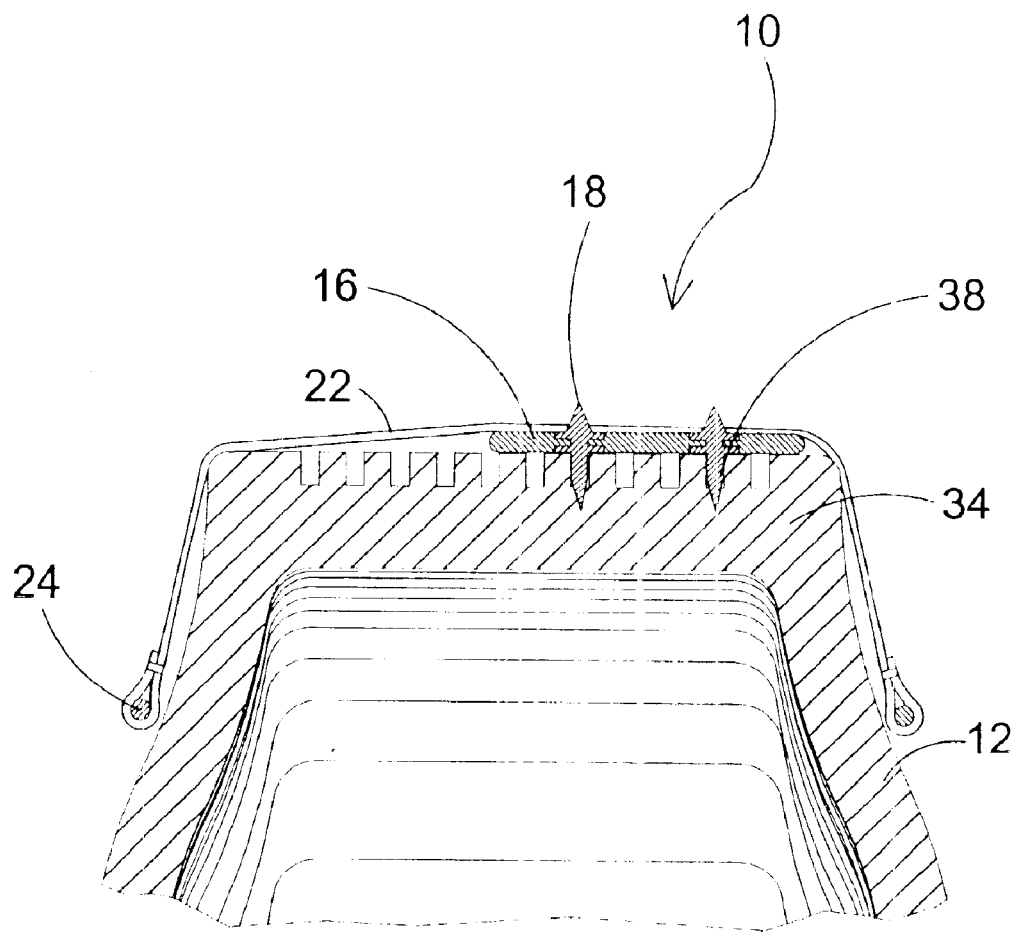
FIG. 4 is a cross sectional side view of the present invention installed on a tire.

Turning to FIG. 4, shown therein is a cross sectional front view of the present invention 10 installed on a tire 12. Shown is the present invention 10 having a plurality of embedding members 38, being embedded spike-like members 18, disposed thereon to penetrate into the rubber on the outside perimeter of the tire 12 to provide frictionally sustained attachment for the traction belt 16. Also shown are the securement cable 22, the tension cable 24 and tire tread 34.

Figure 5:
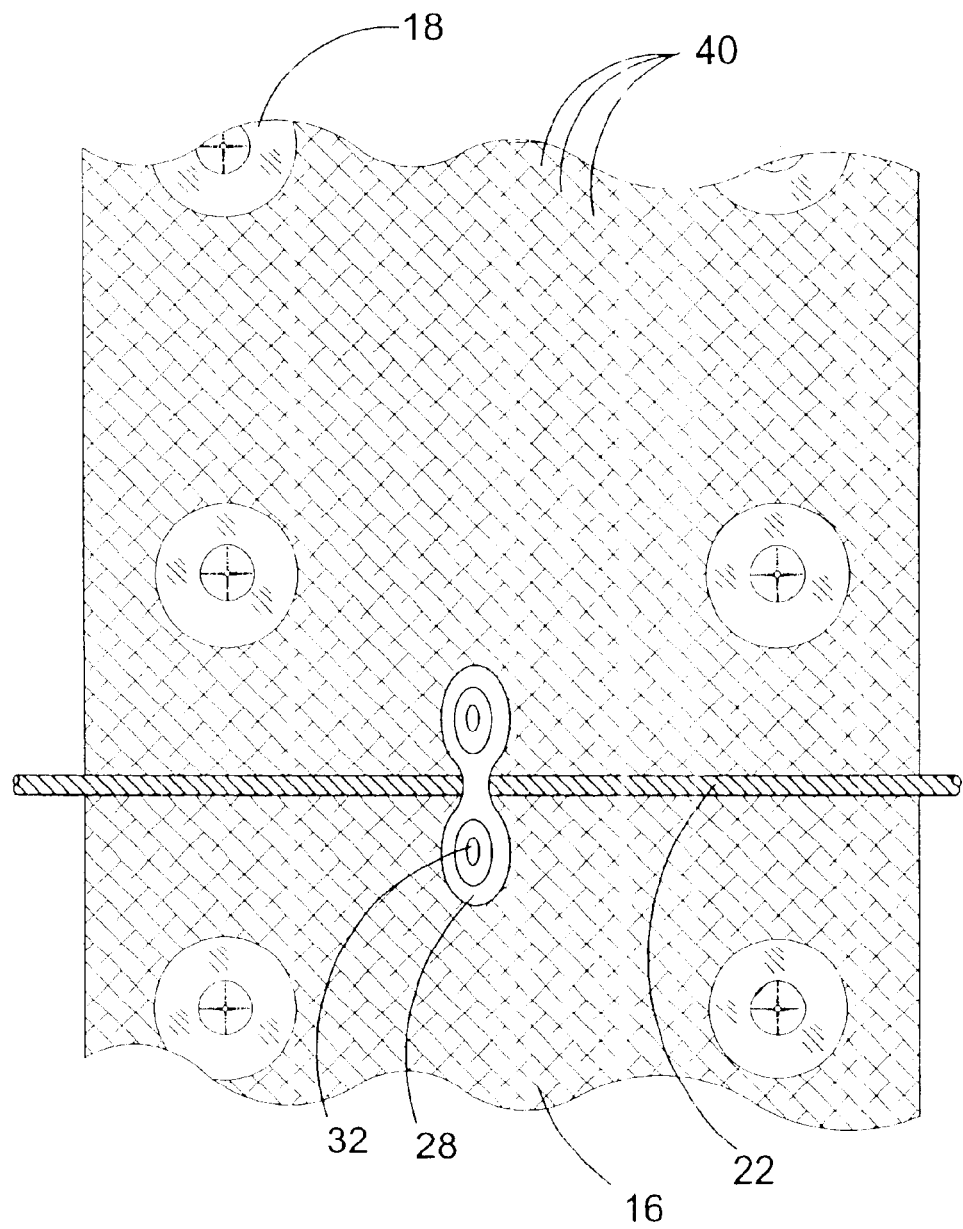
FIG. 5 is a top view of the traction belt.

Turning to FIG. 5, shown therein is a top view of the traction belt 16. Shown is the traction belt 16 being composed of a durable, pliable material 40 with the studs or spikes 18 fasten or riveted therethrough.

What is claimed to be new and desired to be protected by Letters Patent is set forth in the appended claims:

1. An apparatus for a traction belt for placement onto the tire of a vehicle for improved traction on icy or snowy surfaces, comprising:

a) a vehicle having a plurality of tires thereon;

b) said tires each having an outer front side and an inner back side, and a tread on the outer periphery thereof;

c) a traction belt of pliable material about one-half the width of the treads of said tire disposed about said periphery of said tire, said traction belt having a first end and a second end, said traction belt having an inside and an outside surface, said inside surface of said traction belt being contiguous to said tread of said tires;

d) a plurality of spikes disposed in said traction belt, said spikes having a first end and a second end, wherein said first end of said spikes is disposed on said inside surface of said traction belt to permit contact with the outer periphery of the tire, and, wherein said second end of said spikes is disposed on said outside surface of said traction belt to permit traction on icy or snowy surfaces;

e) means for securing said traction belt to said tire whereby the traction belt is removably attached to the tire;

f) said spikes passing through said traction belt, wherein said first end of said spikes is disposed on said inside surface of said traction belt to permit contact with this outer periphery of the tire and said second end of said spikes is disposed on said outside surface of said traction belt to permit traction on icy or snowy surfaces, the first end of said spikes penetrates into the tire tread surface on the outer periphery of the tire so that the traction belt is secured to the outer periphery of the tire, the spikes being connected to said traction belt with rivets; and g) said means for securing the traction belt to the tire, comprising:

i) plurality of cable loops disposed on said first and second ends of said traction belt wherein said first and second ends of said traction belt are secured to each other with a securement cable wherein said securement cable passes through said cable loops;

ii) a plurality of securement cables disposed about the periphery of the traction belt, said securement cables having a first end and a second end, said securement cables disposed perpendicular to said traction belt;

iii) a pair of tension cables, wherein the first of said tension cables is disposed on said outside surface of the tire for receiving said first end of said securement cables, wherein the second of said tension cables is disposed on said inside surface of the tire for receiving said second end of said securement cable, wherein each of said pair of said tension cables has a first end and a second end to permit the first and second ends of said tension cables to be connected to each other;

iv) a first and second connector for joining said first and second ends of said tension cables together to permit the tension cable to be tightened upon the tire; and v) a plurality of figure eight securements for connecting said securement cables to the outside surface of said traction belt.

2. The apparatus of claim 1, wherein each of said cable loops on said first and second ends of said traction belt each have an eyelet therein formed by said cable loop wherein said eyelets each receive said securement cable therethrough to permit the first and second ends of the traction belt to be joined together.

3. The apparatus of claim 2, wherein said first connector for joining the ends of a first tension cable comprises a quick release clip to permit the quick coupling and decoupling of the ends of the first tension cable.

4. The apparatus of claim 3, wherein said quick release clip is disposed on said backside of said tire.

5. The apparatus of claim 4, wherein said second connector for joining the ends of a second tension cable comprises a tightening adjustment device to permit the tension cable to be tightened about the tire.

6. The apparatus of claim 5, wherein said tightening adjustment device is disposed on said front side of said tire.

7. The apparatus of claim 6, wherein said plurality of cable loops are connected to said tension belt by a plurality of studs, wherein said studs pass through said traction belt to permit the cable loops to be connected to the tension belt.

* * * * *